US00RE47496E

(19) United States
(12) Reissued Patent
Hannig

(10) Patent Number: US RE47,496 E
(45) Date of Reissued Patent: Jul. 9, 2019

(54) PANEL

(71) Applicant: AKZENTA PANEELE + PROFILE GMBH, Kaisersesch (DE)

(72) Inventor: Hans-Juergen Hannig, Bergisch Gladbach (DE)

(73) Assignee: AKZENTA PANEELE + PROFILE GMBH, Kaisersesch (DE)

(21) Appl. No.: 15/944,141

(22) Filed: Apr. 3, 2018

Related U.S. Patent Documents

Reissue of:
(64) Patent No.: 8,720,150
Issued: May 13, 2014
Appl. No.: 13/996,313
PCT Filed: Dec. 13, 2011
PCT No.: PCT/EP2011/072573
§ 371 (c)(1),
(2) Date: Jun. 20, 2013
PCT Pub. No.: WO2012/084604
PCT Pub. Date: Jun. 28, 2012

(30) Foreign Application Priority Data

Dec. 22, 2010 (DE) ..... 10 2010 063 976

(51) Int. Cl.
*E04C 2/38* (2006.01)
*E04F 13/08* (2006.01)
(Continued)

(52) U.S. Cl.
CPC ..... *E04F 15/02038* (2013.01); *E04C 2/38* (2013.01); *E04F 13/0894* (2013.01);
(Continued)

(58) Field of Classification Search
CPC ..... E04F 15/02038; E04F 15/105; E04F 13/0894; E04F 2201/0146;
(Continued)

(56) References Cited

U.S. PATENT DOCUMENTS 4,426,820 A * 1/1984 Terbrack et al. ..... 52/590.1
6,505,452 B1 * 1/2003 Hannig et al. ..... 52/582.1
(Continued)

FOREIGN PATENT DOCUMENTS

CN 1422356 A 6/2003
DE 10 2004 001 363 A1 8/2005
(Continued)

OTHER PUBLICATIONS

Office Action of parallel Chinese application No. 201110087475.5 dated Nov. 11, 2014 and English translation thereof.

*Primary Examiner* — William C Doerrler
(74) *Attorney, Agent, or Firm* — Lucas & Mercanti, LLP; Klaus P. Stoffel

(57) ABSTRACT

The invention relates to a panel with complementary locking means provided in pairs on opposite panel edges. One of the locking means is hook profiles with a receiving hook and a locking hook. The free step end of the locking hook is designed narrower than the width of the receiving opening of the receiving hook. The locking contour of the locking hook protrudes at least partially past the plane of the joint surface of the receiving hook so that the free step end fits into the receiving opening far enough at first that a part of the horizontal locking surface of the locking hook makes contact with the horizontal locking surface of the receiving hook during a joining motion without elastic deformation of the hook profiles, and that the receiving hook bends so that the width of the receiving opening can be expanded so that the locking step can be inserted entirely into the receiving recess and the locking contour of the locking hook is further inserted into a form-fit contour of the receiving hook.

11 Claims, 3 Drawing Sheets

(51) Int. Cl.
*E04F 15/02* (2006.01)
*E04F 15/10* (2006.01)

(52) U.S. Cl.
CPC .... *E04F 15/105* (2013.01); *E04F 2201/0146* (2013.01); *E04F 2201/0153* (2013.01); *E04F 2201/0176* (2013.01); *E04F 2201/03* (2013.01)

(58) Field of Classification Search
CPC ..... E04F 2201/0176; E04F 2201/03; E04F 2201/0153; E04C 2/38
USPC ..... 52/590.2, 591.1, 592.1, 582.1, 590.3
See application file for complete search history.

(56) References Cited

U.S. PATENT DOCUMENTS 6,591,568 B1 7/2003 Paalsson
6,647,690 B1 * 11/2003 Martensson ..... 52/601
6,854,235 B2 * 2/2005 Martensson ..... 52/601
7,841,145 B2 * 11/2010 Pervan ..... E04B 5/00 52/395
8,024,904 B2 * 9/2011 Hannig ..... 52/586.1
8,038,363 B2 * 10/2011 Hannig et al. ..... 403/339
8,091,238 B2 * 1/2012 Hannig ..... 29/897.32
8,132,384 B2 * 3/2012 Hannig ..... 52/582.1
8,365,499 B2 * 2/2013 Nilsson et al. ..... 52/747.1
8,375,672 B2 * 2/2013 Hannig ..... 52/588.1
8,381,476 B2 * 2/2013 Hannig ..... 52/582.1
8,499,521 B2 * 8/2013 Pervan et al. ..... 52/588.1
8,544,231 B2 10/2013 Hannig
2010/0031594 A1 2/2010 Liu
2013/0097959 A1 * 4/2013 Michel ..... E04F 15/02 52/588.1

FOREIGN PATENT DOCUMENTS

WO 01/75247 A1 10/2001
WO 2010015516 A2 2/2010

* cited by examiner

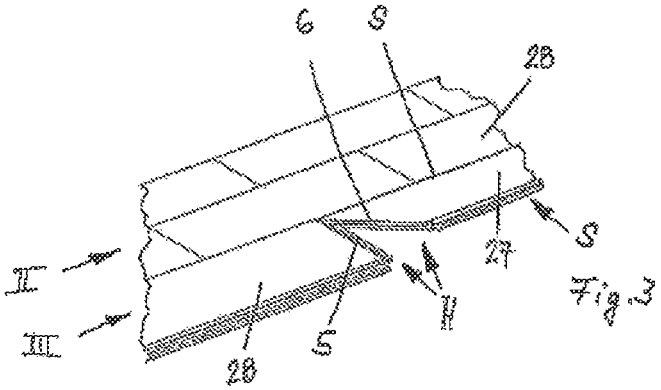
Fig. 3
Fig. 4
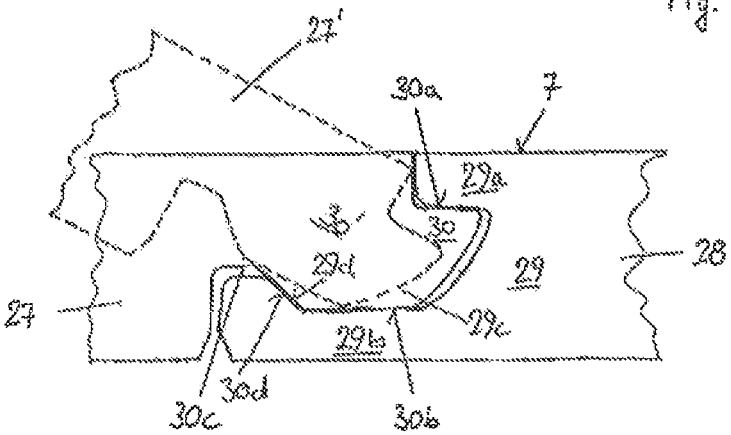

PANEL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This] *The present* application is a *Reissue of U.S. Pat. No. 8,720,150, issued May 13, 2014, which is a* 371 of PCT/EP2011/072573 filed Dec. 13, 2011, which in turn claims the priority of DE 10 2010 063 976.1 filed Dec. 22, 2010, the priority of [both] *all* applications is hereby claimed and [both] *all* applications are incorporated by reference herein.

BACKGROUND OF THE INVENTION

The invention concerns a panel, in particular a floor panel, comprising a body with at least one plastic layer, complementary locking means provided in pairs at mutually opposite panel edges so that a plurality of said panels can be locked together, at least one pair of locking means with hook profiles, namely a receiving hook and in opposite relationship thereto an arresting hook, with the proviso that the receiving hook has remote from the body a hook edge and arranged nearer to the body a receiving recess, wherein the receiving recess is open towards the top side, the arresting hook is provided with an arresting recess arranged nearer to the body and open to the underside and has an arresting step which is arranged remote from the body and which fits in a vertical joining direction into the receiving recess of the receiving hook, the arresting hook has a joining surface remote from the body and also remote from the body a vertically acting arresting contour, the receiving hook has a joining surface nearer to the body and also nearer to the body a positively locking contour which fits together in positively locking relationship with the arresting contour, that is remote from the body, of the arresting hook so that vertical locking can be implemented, the arresting hook has arranged nearer to the body a horizontal locking surface at its arresting step, the receiving hook has arranged remote from the body a horizontal locking surface in the receiving recess, formed at the receiving hook is a narrowed receiving opening through which the arresting step can be inserted substantially in the vertical joining direction into the receiving recess.

A panel of the general kind set forth, for floors, is known from WO 2010/015516. The hook profiles of the known panels are adapted to the material from which the body of the panel is formed. Those panels which have a body comprising a flexurally soft and elastic plastic material can be hooked. The arresting contour provided beneath the joining surface of the arresting hook has regions which project with respect to the plane of the joining surface and other regions which are set back with respect to the plane of the joining surface. Equally the positively locking contour provided beneath the joining surface of the receiving hook has regions which project with respect to the plane of the joining surface and other regions which are set back with respect to the plane of the joining surface. The above-mentioned regions which project and are set back on the positively locking contour and the arresting contour form undercut configurations which counteract movement of the two hook profiles away from each other in a direction perpendicularly to the plane of the panel (vertically). To be able to fit the undercut configurations together the arresting contour and the positively locking contour are pressed against and past each other. In that case they have to be elastically deformed. The arresting contour and the positively locking contour are softly elastic and in that way can be brought into positively locking contact with each other. The maximum amount of undercut configuration is limited by virtue of the soft-elastic property of the plastic material. The action of vertical locking is unsatisfactory.

SUMMARY OF THE INVENTION

The object of the invention is to improve the panel that the large number of plastic materials which can be used for the body is increased and the action of vertical locking is improved as much as possible.

According to the invention that object is attained in that the arresting contour, that is remote from the body, of the arresting hook is set back behind the plane of the joining surface of the arresting hook, the positively locking contour, that is nearer to the body, of the receiving hook projects at least partially beyond the plane of the joining surface of the receiving hook, the arresting step and the receiving opening are of such a configuration that the step end during a joining movement initially fits without elastic deformation of the hook profile into the receiving opening to such an extent that the horizontal locking surface of the arresting hook makes contact with a part of its surface with the horizontal locking surface of the receiving hook and the receiving hook has a flexural leg so adapted that the width of the receiving opening can be enlarged by its elastic bendability so that the arresting step can be entirely inserted into the receiving recess and also the arresting contour of the arresting hook is inserted into the positively locking contour of the receiving hook.

Those measures make it possible for the hook profile portions to come into engagement at the beginning of the joining movement without already being elastically deformed at the engagement location, it is only upon further advance in respect of the joining movement that the undercut regions of the arresting contour and the positively locking contour come into contact at the engagement location in such a way that elastic deformation is caused, the flexural leg being specifically provided for the purposes of elastic deformation. Admittedly the arresting contour and the positively locking contour are also pressed and deformed, but, the harder and more brittle that the plastic material of the body is, the correspondingly less is the degree of elastic deformation of the arresting contour and the positively locking contour and the correspondingly greater is the proportion of elastic deformation of the flexural leg. By virtue of that design configuration it is now possible, even when the body is formed from a relatively hard and brittle plastic material, to provide a high degree of undercut configuration for positively locking engagement between the arresting contour and the positively locking contour. The positively locking contour for example can have a latching element which projects further than in the state of the art, and the arresting contour has a latching recess which is complementary to the latching element and which is deeper than in the state of the art. Nonetheless the arresting contour and the positively locking contour can be brought into engagement without any problem because the flexural leg adapted for that purpose elastically flexes and that flexing permits an enlargement of the receiving opening. In that way the arresting contour and the positively locking contour can be moved past each other without severe inherent deformation thereof, until they are in engagement.

The plastic layer of the body or core can be formed from a soft elastic plastic material like a thermoplastic polymer, for example polyolefin, polypropylene, polyurethane or polyamide. So-called soft PVC can also be considered as a soft plastic material. This involves a polyvinyl chloride which contains plasticiser. Basically however PVC is an amorphous elastomer which has a natural hardness and brittleness which can only be reduced by the plasticiser.

Advantageously however the panel is of such a configuration that it is also possible to produce the plastic layer of the core from a plastic material with natural hardness and brittleness, for example an amorphous elastomer like PVC which contains no plasticiser at all or only a small amount of plasticiser.

Depending on the respective embodiment of the invention the thickness of the panels according to the invention is 3 to 10 mm, preferably 4 to 8 mm, particularly preferably 5 to 6 mm. The weight in relation to surface area of the panel, depending on the respective thickness and specific structure, is between 1 and 2.5 kg/m$^2$, preferably between 1.6 and 1.8 kg/m$^2$.

Remote from the body, a resilient latching tongue can be provided at the hook edge of the receiving hook, wherein near the body the arresting recess has a latching recess which fits together with the resilient latching tongue. That provides a second location within the hook connection, which is to be joined into each other by elastic deformation of a region which is provided and adapted for that purpose, namely the resilient latching tongue. The resilient latching tongue, together with the arresting recess, also implements locking of the two hook profile portions in a vertical direction, that is to say perpendicularly to the plane of the locked panels.

The elastic properties of the body can be used if the resilient latching tongue is formed integrally with the body. If the body is formed from a relatively hard plastic material, that promotes inter alia production of the resilient latching tongue by cutting production processes like milling.

The resilient latching tongue is rooted at the side remote from the body of the hook edge and the free end of the resilient latching tongue projects inclinedly from the hook edge, for example inclinedly downwardly. The resilient latching tongue is always so arranged that contact with the complementary hook profile portion causes inward spring movement of the integral latching tongue, which moves same closer to the body of its panel.

Desirably the resilient latching tongue has a sliding surface, remote from the body. That surface comes into contact with the arresting hook during a vertical joining movement. That movement causes the resilient latching tongue to be moved closer to the hook edge of the receiving hook. In that way it is elastically stressed and enables the joining movement. The arresting hook can then be introduced further into the receiving hook until both panels are in one plane.

A free space into which the latching tongue can elastically springingly engage can be provided between the resilient latching tongue and the hook edge. Elastic prestressing makes it possible for the resilient latching tongue to spring back in the direction of its neutral position if there is space for same.

Desirably the latching recess has a latching contact surface. By contact with the resilient latching tongue that provides for arresting of connected panels in a vertical direction.

Preferably the latching contact surface is of such a configuration that it forms an inclined abutment surface for the free end of the resilient latching tongue. The inclined abutment surface is of such a configuration that the stressed latching tongue, when it springs back in the direction of its neutral position, comes to bear against that inclined abutment surface. It can further be so arranged that the latching tongue bears against the abutment surface before it reaches its neutral position so that a residual part of the stressing is always maintained in the latching tongue, and that serves to provide a secure arresting action.

It is considered to be a further advantage if the arresting step, on its side remote from the body, has a sliding incline to be referred to as an inclined sliding surface. The inclined sliding surface is desirably of such a configuration that it cooperates with that region of the positively locking contour, that projects. That region of the positively locking contour, that projects from the joining plane, forms for example a projecting latching element. The projecting region cooperates with the inclined sliding surface of the arresting step. As soon as the inclined sliding surface comes into contact with the projecting region, for example the latching element, it slides along the latching element. In that way, firstly the joining surfaces of the receiving hook and the arresting hook are moved away from each other. At the same time the horizontal locking surface of the arresting hook exerts a force which presses against the horizontal locking surface of the receiving hook. That force which is applied to the horizontal locking surface of the receiving hook is transmitted to the flexural leg of the receiving hook, which is thereby elastically bent. In the further joining movement the arresting contour passes the positively locking contour to such an extent until both have reached a position in which they fit into each other in positively locking relationship. In that case, by way of the horizontal locking surface of the receiving hook, the flexural stress in the flexural leg exerts a force which again prestresses the joining surface of the arresting hook in the direction of the joining surface of the receiving hook. It is possible to achieve a closed join in that way. The horizontal locking surfaces of the two hook profile portions are then preferably in a condition of bearing closely against each other.

The degree of flexing of the flexural leg can be influenced by the geometrical shape of the inclined sliding surface (linear or curved). The flexural stress produced can be so adapted by a variation in the inclined sliding surface that the plastic material is not overloaded in the region of the flexural leg and does not suffer any damage.

A pair of the complementary locking means is in the form of pivotal profile portions. More specifically there is provided a groove profile portion with an undercut configuration of a groove wall and a tongue profile portion with an undercut configuration of a tongue portion side.

That has the advantage that panels can desirably be so laid that a new panel with a pivotal profile portion is fitted to the complementary pivotal profile portion of a panel which is already disposed in the laying plane and is pivoted downwardly.

Advantageously in that respect the hook profile portion of the new panel can be simultaneously locked to the hook profile portion of a panel in the same row of panels. For that purpose the arresting hook of the new panel is moved downwardly substantially in a vertical plane in a scissor-like movement and inserted into the receiving hook. During the scissor-like movement the arresting step firstly projects only at one end of the panel edge into the receiving opening. When the scissor-like joining movement continues the arresting step moves step by step into the receiving opening. The elastic deformation of the flexural leg, which is initiated thereby, also increases step by step. When the panels are finally disposed in one plane the arresting contour and the positively locking contour are exactly fitted into each other, the joining surfaces are in contact with each other and form a closed join. In addition the flexural stress in the flexural leg is eliminated again and the horizontal locking surfaces of the two hook profile portions bear snugly against each other in surface contact.

The area of use can be increased if a decorative layer is provided at the top side of the panel. A further benefit is afforded by the provision of a transparent cover layer through which the decorative layer is visible. The transparent cover layer serves to protect the decorative layer, it can be provided with means which reduce wear, for example corundum particles, glass particles and so forth. In that respect it may be desirable if a backing layer is provided at the underside of the panel. That acts as a balance for the layers provided at the top side, to counteract distortion of the panel.

BRIEF DESCRIPTION OF THE DRAWINGS

The invention is illustrated by way of example in a drawing hereinafter and described in detail by reference to a number of Figures in which:

FIG. 3 shows a floor covering comprising panels according to the invention, which have a second pair of edges with complementary locking means in the form of pivotal profile portions, and FIG. 4 shows an embodiment for a pair of edges comprising pivotal profile portions.

DETAILED DESCRIPTION OF THE INVENTION

Figure 1A:
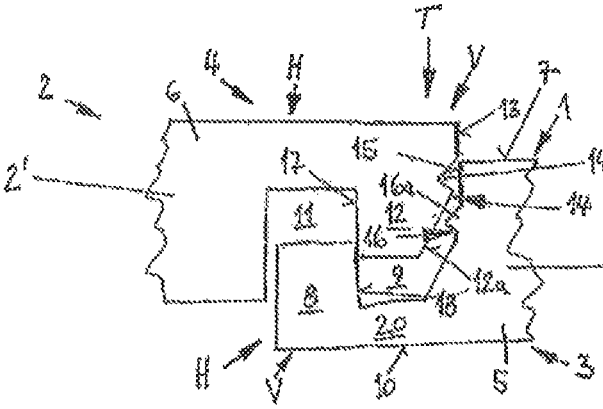
FIGS. 1a-1d show complementary locking means of a first pair of edges of a panel according to the invention and a stepwise joining movement for locking two panels.

FIGS. 1a to 1d each show a portion of two panels 1 and 2 respectively. The panels 1 and 2 are identical. Each individual panel has complementary profile portions 3 and 4 respectively at mutually opposite panel edges of a pair of edges. In the case of the panel 1 therefore the edge which is not shown identically has the profile portion 4 of the panel 2 while in the case of the panel 2 the edge which is not shown identically has the profile portion 3 of the panel 1.

In the case of a panel having four edges the second pair of edges can be formed with complementary profile portions which are identical to those of the first pair of edges.

The series in FIGS. 1a to 1d illustrates in a plurality of steps the implementation in principle of the joining movement for the purposes of connecting and locking the panels 1 and 2.

The complementary profile portions 3 and 4 of each panel 1 and 2 respectively form complementary locking means V in the form of hook profile portions H. The hook profile portion of the profile portion 1 forms a receiving hook 5 and the hook profile portion of the profile portion 2 forms an arresting hook 6 which fits into the receiving hook 5, wherein the two hook profile portions are of such a configuration that an arresting action is produced. The arresting action counteracts a reversal of the joining movement. The panels 1 and 2, after locking has been effected, can thus not be released from each other in a rearward movement.

Each panel 1 and 2 respectively includes a body 1' and 2' respectively with a plastic layer at which the above-mentioned complementary locking means V are arranged. A top side 7 of the panel forms a working surface. Provided on the receiving hook 5 remote from the body is a hook edge 8 and nearer to the body a receiving recess 9. The receiving recess 9 is open to the top side 7.

The arresting hook 6 is provided with an arresting recess 11 which is arranged closer to the body and which is open to the underside 10, and has an arresting step 12 at a position remote from the body. The arresting step 12 fits in a vertical joining direction T into the receiving recess 9 of the receiving hook 5. In addition the arresting hook 6 has a joining surface 13 remote from the body and also remote from the body an arresting contour 14 which has a vertically locking action. Near the body the receiving hook 5 has a joining surface and also near to the body a positively locking contour 16 which fits together in positively locking relationship with the arresting contour 14 of the arresting hook 6. It is possible in that way to implement vertical locking.

In addition, arranged near the body the arresting hook 6 has a horizontal locking surface 17 arranged at its arresting step 12. In matching relationship therewith the receiving hook 5, arranged in the receiving recess 9 remote from the body, has a horizontal locking surface 18 cooperating with the horizontal locking surface 17 of the arresting hook 6.

At its receiving recess 9 the receiving hook 5 is provided with a narrowed receiving opening 19. The arresting step 12 can be introduced into the receiving recess 9 substantially in a vertical joining direction T, that is to say, in a plane perpendicularly to the plane of the locked panels.

Referring to FIGS. 1a to 1d, the panel 1 is arranged with the receiving hook 5 on a fixed substrate (not shown). The arresting step 12 of the panel 2 is lowered perpendicularly to the plane of the panel (vertically). The arresting contour 14, that is remote from the body, of the arresting hook 5 has a latching recess 14a which is set back behind the plane of the joining surface 13 of the arresting hook 6. The positively locking contour 16, that is near the body, of the receiving hook 5 is of such a configuration that it has a latching element 16a which projects beyond the plane of the joining surface 15 of the receiving hook 5 and in the locked condition engages into/behind the latching recess 14a of the arresting hook 6. In addition the arresting step 12 and the receiving opening 19 are of such a configuration that the free end of the arresting step 12, during the beginning of the joining movement, firstly fits into the receiving opening 19 without any elastic deformation worth mentioning of the hook profile portions. In that case the horizontal locking surface 17 of the arresting hook 6 comes into contact with a part of its surface with the horizontal locking surface 18 of the receiving hook 5.

Figure 1B:
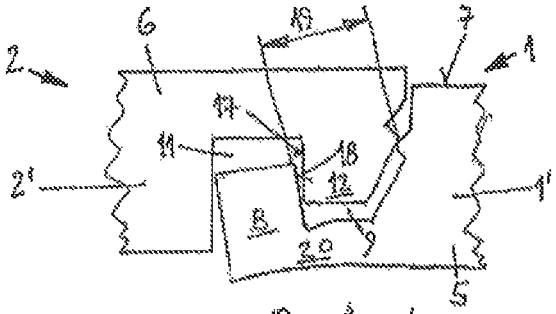
Figure 1C:
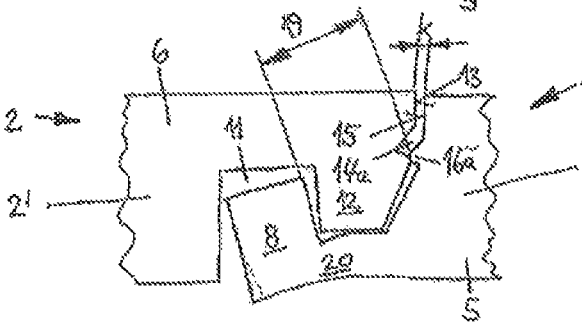

Provided on the receiving hook 5 is a particular flexural leg 20 which can best be seen from FIGS. 1b and 1c. The flexural leg 20 is of such a configuration that the width of the receiving opening 19 can be enlarged by the elastic bendability of the leg so that the arresting step 12 can be inserted into the receiving recess 9 without any problem. In addition, because of the bendability of the flexural leg 20, the arresting contour 14 of the arresting hook 6 can be very easily introduced into the positively locking contour 16 of the receiving hook 5.

At the beginning of the joining movement the hook profile portions are to be brought into engagement without already being elastically deformed at the engagement location. It is only upon further progress with the joining movement that the undercut regions of the arresting contour 14 and the positively locking contour 16 come into contact at the engagement location. That contact however causes elastic deformation which takes place substantially at another location, more specifically at the flexural leg 20 provided for that purpose. Admittedly the arresting contour 14 and the positively locking contour 16 are also pressed and deformed, but the harder and more brittle that the plastic material of the body is, the correspondingly less is the elastic deformation of the arresting contour 14 and the positively locking contour 16 and the correspondingly greater is the degree of elastic deformation of the flexural leg 20.

The latching recess 14a of the arresting hook 6 is deeper than in the state of the art. Equally the latching element 16a of the receiving hook 5 projects further from the joining surface 15 of the receiving hook 5 than in the state of the art. As a result, there is a greater degree of undercut configuration in the vertical joining direction than in the state of the art. Nonetheless the arresting contour 14 and the positively locking contour 16 can be brought into engagement without any problem. This is because the flexural leg 20 is elastically bendable in such a way that such bending permits enlargement of the receiving opening 19. The arresting contour 14 and the positively locking contour 16 can thus be moved past each other without severe inherent deformation thereof until they are in positively locking engagement and deploy their vertical locking action.

FIG. 1b shows that an inclined surface is provided remote from the body at the arresting step 12, that surface forming an inclined sliding surface 12a. The inclined sliding surface contacts the projecting latching element 16a of the positively locking contour 16 of the receiving hook. As a result, during the vertical joining movement of the arresting hook 16, a horizontal movement is superimposed, which moves the panels away from each other so that a space is formed between the joining surfaces 13, 15. At the same time the horizontal locking surface 17 of the arresting hook 6 exerts a force which presses against the horizontal locking surface 18 of the receiving hook 5. The force acting on the horizontal locking surface 18 of the receiving hook 5 is transmitted to the flexural leg 20 of the receiving hook 5, which as a result is elastically bent.

In the further joining movement as shown in FIG. 1c the widest location of the arresting step 12 passes the enlarged receiving opening 19 of the receiving recess 9. Bending of the flexural leg 20 then decreases and the receiving opening 19 narrows again. The joining surfaces 13, 15 of the panels, that are at the spacing k, are pressed against each other by the flexural stress in the flexural leg 20.

Figure 1D:
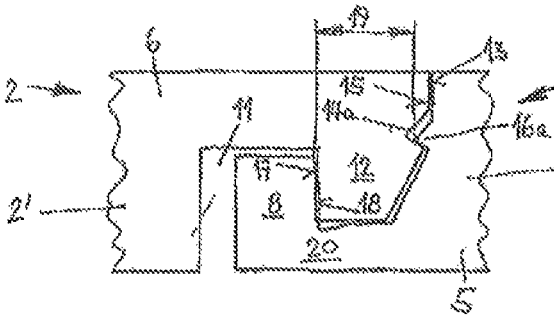
Figure 2A:
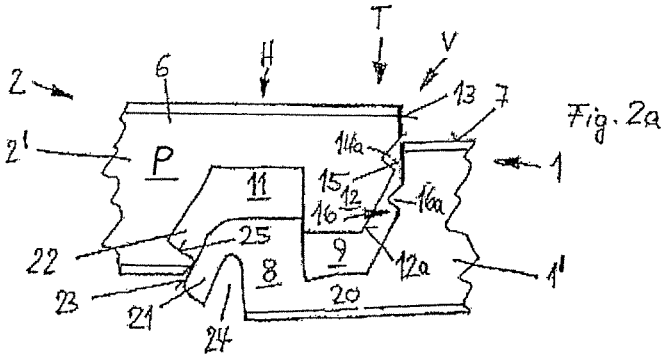
FIGS. 2a-2d show an alternative embodiment of a first pair of edges of complementary locking means of a panel and the stepwise joining movement for locking two panels.
Figure 2B:
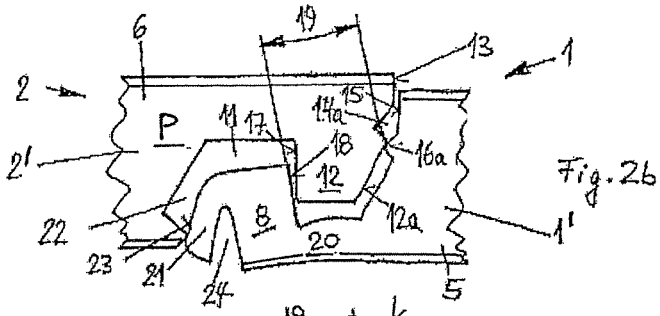
Figure 2C:
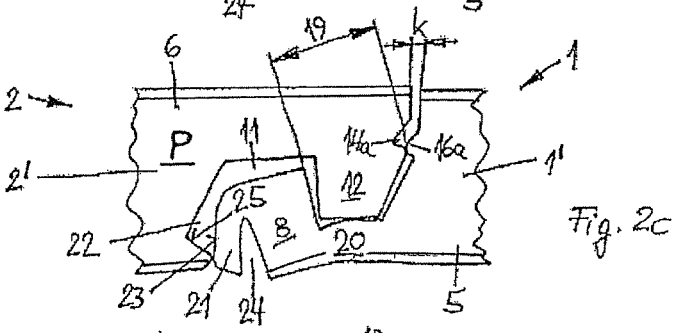
Figure 2D:
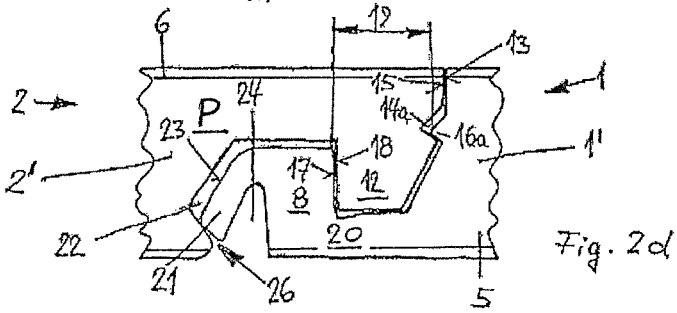

In FIG. 1d the arresting contour 14 and the positively locking contour 16 have reached a position in which they fit into each other in positively locking relationship. The hook profile portions H can be so designed that a residual flexural stress is maintained in the flexural leg 20 and an elastic force (spring force) is exerted by way of the horizontal locking surface 18 of the receiving hook 5, which force prestresses the joining surface 13 of the arresting hook 6 permanently in the direction of the joining surface 15 of the receiving hook 5. A closed join can be permanently achieved in that way. In FIG. 1d the horizontal locking surfaces 17, 18 of the two hook profile portions H are in a condition of bearing closely against each other and they do not exert a permanent prestressing action.

FIGS. 2a to 2d each show a portion of two panels 1 and 2 respectively. They are again identical. Each individual panel has the illustrated complementary profile portions at mutually opposite panel edges of a pair of edges. In the case of a panel with four edges the second pair of edges are provided with complementary profile portions identical to the panel edges of the first pair of edges.

The series of the Figures once again shows in a plurality steps 2a to 2d the implementation in principle of the joining movement for connecting and locking the panels.

The embodiment of the panel 1 and 2 respectively as shown in FIGS. 2a to 2d substantially corresponds to the embodiment of FIGS. 1a to 1d. In that respect the same references are used for identical features, as in FIGS. 1a to 1d. As shown in FIGS. 2a to 2d, there is provided a second positively locking locking action. For that purpose there is provided a resilient latching tongue which is rooted at the hook edge 8 of the receiving hook 5. Near the body the arresting recess 11 has a latching recess 22 which cooperates with the resilient latching tongue 21, in that way there is a second location within a hook connection, which is to be fitted into each other without any problem by elastic deformation of a region adapted and provided for that purpose, namely the resilient latching tongue 21. The resilient latching tongue 21 together with the arresting recess 9 also provides for locking of the two hook profile portions H in a vertical direction, that is to say perpendicularly to the plane of the locked panels.

The resilient latching tongue 21 is integral with the body. In that respect use is made of the elastic properties of the body. It is desirable for the locking effect of the resilient latching tongue 21 if the plastic material of plastic layer P of the body is relatively hard and flexurally stiff. A harder plastic material therefore acts better than a soft plastic material which yields easily.

The resilient latching tongue 21 projects inclinedly downwardly from the hook edge 8. When the panel 1 is lying with its underside 10 on a substrate (not shown) the free end of the resilient latching tongue 21 points in the direction of the substrate. Remote from the body the resilient latching tongue 21 has a sliding surface 23 which comes into contact with the arresting hook 6 during the joining movement and thus causes an inward spring movement of the latching tongue 21. Due to that movement the latching tongue 21 is moved closer to the hook edge 8 or closer to the body of the panel 1. In that case the resilient latching tongue 21 is elastically stressed and enables the vertical joining movement so that the arresting hook 6 can be further lowered. The arresting hook 6 can then be further introduced into the receiving hook 5 until the two panels 1 and 2 are disposed in one plane. A free space 24 into which the latching tongue 21 can elastically springingly engage is provided between the resilient latching tongue 21 and the hook edge 8. Elastic prestressing of the latching tongue 21 makes it possible for the latching tongue to spring back in the direction of its neutral position if there is space for same. Space is available when the latching tongue 21, during the joining movement, passes into the region of the latching recess 22 of the arresting hook 6.

The latching recess 22 has a latching contact surface 25 which, by contact with the resilient latching tongue 21, causes vertical arresting of interconnected panels, that is to say, perpendicularly to the panel plane.

The latching contact surface 25 is of such a configuration that it forms an inclined abutment surface for the free end of the resilient latching tongue 21. The inclined abutment surface 26 is of such a configuration that the stressed resilient latching tongue 21, when it springs back in the direction of its neutral position, comes to bear against that inclined abutment surface 26 before reaching its neutral position. Thus a residual prestressing is always maintained in the latching tongue 21, thereby ensuring a secure arresting action.

A preferred embodiment of a quadrangular panel is shown in FIG. 3 which illustrates portion-wise the production of a floor covering from panels according to the invention. The panels used involve an embodiment with a first pair of edges having complementary hook profile portions H and a second pair of edges provided with complementary positively locking pivotal profile portions S. The pivotal profile portions S serve to interconnect panels of differing rows of panels. In this embodiment the hook profile portions H serve to interconnect panels of the same row of panels. The hook profile portions H of the first pair of edges can be so designed as in the embodiment of FIGS. 1a to 1d. Alternatively the hook profile portions H of the first pair of edges can correspond to the embodiment shown in FIGS. 2a to 2d.

FIG. 3 shows in the foremost row of panels III a new panel 27 which is to be locked both to the previous row of panels II and also to the adjacent panel 28 of the same row III. The new panel is fitted inclinedly in relation to the plane of the laid panels and is attached with its pivotal profile portions S to the front row of panels II. Then it is locked to the previous row II by downward pivotal movement into the plane of the laid panels. At the same time in that case the hook profile portion (arresting hook 6) of the new panel 27 is also locked to the hook profile portion (receiving hook 5) of the panel 28 of the same row III. While the new panel 27 pivots downwardly into the plane of the laid panels the arresting hook 6 is simultaneously brought into engagement with the receiving hook 5 in a scissor-like joining movement. The receiving hook 5 has a flexural leg whose elastic bending is completed step by step, the further the arresting hook 6 is moved in the direction of the receiving hook 5 or the further the arresting step of the arresting hook 6 is inserted into the receiving recess of the receiving hook 5.

The second pair of edges can be implemented with complementary pivotal profile portions S in the form of all known positively locking profile portions which can be positively lockingly connected by inclinedly fitting a new panel to a previous row of panels and then pivoting the new panel downwardly into the plane of the laid panels. An embodiment of such a pivotal profile portion S is shown in FIG. 4.

The complementary pivotal profile portions S in FIG. 4 include a groove profile portion 29 and a tongue profile portion 30. The groove profile portion 29 has an upper groove wall 29a which is shorter than the lower groove wall 29b. The lower groove wall 29b is also provided with an undercut recess 29c for the tongue profile portion 30. The recess 29 also has a horizontal locking surface 29d. The tongue profile portion 30 is provided with a tongue top side 30a arranged substantially parallel to the top side 7 of the new panel 27. The tongue underside 30b has an undercut configuration 30c and a horizontal locking surface 30d which cooperates with the horizontal locking surface 29d of the lower groove wall 29b. The inclined position of the new panel 27 shown in FIG. 3 is clearly indicated in FIG. 4 by the position shown in broken line of the tongue profile portion 30'. The tongue underside 30b is placed on the longer lower groove wall 29d. The new panel 27 is moved with the tip of the tongue leading into the groove profile and the new panel 27 is then pivoted downwardly into the plane of the lying panel or panels.

LIST OF REFERENCES

1 panel
1' body
2 panel
2' body
3 profile portion
4 profile portion
5 receiving hook
6 arresting hook
7 top side
8 hook edge
9 receiving recess
10 underside
11 arresting recess
12 arresting step
12a inclined sliding surface
13 joining surface (arresting hook)
14 arresting contour
14a latching recess
15 joining surface (receiving hook)
16 positively locking contour
16a latching element
17 horizontal locking surface (arresting hook)
18 horizontal locking surface (receiving hook)
19 receiving opening
20 flexural leg
21 resilient latching tongue
22 latching recess
23 sliding surface
24 free space
25 latching contact surface
26 inclined abutment surface
27 new panel
27' new panel
28 panel
29 groove profile portion
29a upper groove wall
29b lower groove wall
29c undercut recess
29d horizontal locking surface
30 tongue profile portion
30a tongue top side
30b tongue underside
30c undercut
30d horizontal locking surface
30' tongue profile portion
H hook profile portion
k spacing
S pivotal profile portion
T joining direction
V complementary locking means

The invention claimed is:

1. A panel comprising:

a body with at least one plastic layer, complementary locking means provided in pairs at mutually opposite panel edges, at least one pair of locking means with hook profiles, namely a receiving hook and in opposite relationship thereto an arresting hook, the receiving hook has, remote from the body, a hook edge and arranged nearer to the body a receiving recess, wherein the receiving recess is open towards a top side of the panel, the arresting hook has an arresting recess arranged nearer to the body and open to an underside of the panel and has an arresting step which is arranged remote from the body and which fits in a vertical joining direction into the receiving recess of the receiving hook, the arresting hook has a joining surface remote from the body and, also remote from the body, a vertically acting arresting contour, the receiving hook has a joining surface nearer to the body and, also nearer to the body, a positively locking contour which fits together in positively locking relationship with the arresting contour, that is remote from the body, of the arresting hook so that vertical locking can be implemented, the arresting hook has, arranged nearer to the body, a horizontal locking surface at the arresting step, the receiving hook, arranged remote from the body, has a horizontal locking surface in the receiving recess, formed at the receiving hook is a narrowed receiving opening through which the arresting step can be inserted substantially in the vertical joining direction into the receiving recess, a free step end of the arresting step is narrower than the width of the receiving opening of the receiving hook, the arresting contour, that is remote from the body, of the arresting hook is set back behind the plane of the joining surface of the arresting hook, the positively locking contour, that is nearer to the body, of the receiving hook projects at least partially beyond the plane of the joining surface of the receiving hook, the arresting step and the receiving opening are of a configuration that the free step end during a joining movement initially fits without elastic deformation of the hook profile into the receiving opening to such an extent that a part of the horizontal locking surface of the arresting hook makes contact with the horizontal locking surface of the receiving hook and the receiving hook has a flexural leg so adapted that the width of the receiving opening can be enlarged by elastic bendability of the flexural leg so that the arresting step can be entirely inserted into the receiving recess and also the arresting contour of the arresting hook is inserted into the positively locking contour of the receiving hook, a resilient latching tongue is provided remote from the body at the hook edge of the receiving hook, and the [receiving] *arresting* recess near to the body has a latching recess which fits together with the resilient latching tongue.

2. A panel according to claim 1, wherein the resilient latching tongue is formed in one piece with the body.

3. A panel according to claim 1, wherein the resilient latching tongue is rooted at the side remote from the body of the hook edge and the free end of the resilient latching tongue projects inclinedly from the hook edge.

4. A panel according to claim 1, wherein the resilient latching tongue has a sliding surface remote from the body.

5. A panel according to claim 1, wherein provided between the resilient latching tongue and the hook edge is a free space into which the latching tongue can resiliently springingly engage.

6. A panel according to claim 1, wherein the latching recess has a latching contact surface.

7. A panel according to claim 1, wherein the latching contact surface forms an inclined abutment surface for the free end of the resilient latching tongue.

8. A panel according to claim 1, wherein the arresting step has an inclined sliding surface on its side remote from the body.

9. A panel according to claim 1, wherein a pair of pivotal profile portions, namely a groove profile portion with undercut configuration of a groove wall and a tongue profile portion with undercut configuration of a spring side is provided.

10. A panel according claim 1, wherein a transparent cover layer provided at a top side is provided and a decorative layer visible through the cover layer is provided.

11. A panel according to claim 1, wherein an underside of the panel has a backing layer.

* * * * *